United States Patent [19] [11] 4,406,919
Pospischil [45] Sep. 27, 1983

[54] METHOD AND APPARATUS FOR MONITORING INTERMEDIATE REGENERATIVE REPEATERS

[75] Inventor: Reginhard Pospischil, Lochham, Fed. Rep. of Germany

[73] Assignee: Siemens Aktiengesellschaft, Berlin & Munich, Fed. Rep. of Germany

[21] Appl. No.: 281,849

[22] Filed: Jul. 9, 1981

[30] Foreign Application Priority Data

Jul. 22, 1980 [DE] Fed. Rep. of Germany ....... 3027755

[51] Int. Cl.³ .......................... H04L 25/02; H04L 1/00
[52] U.S. Cl. ................................ 178/69 G; 178/71 T; 179/175.2 C
[58] Field of Search .................. 178/69 G, 70 S, 71 T; 179/175.31, 175.3 F, 175.2 C, 170 F; 371/15, 18, 22

[56] References Cited
U.S. PATENT DOCUMENTS 3,978,449 8/1976 Sanders et al. ............... 178/69 G X

OTHER PUBLICATIONS

Bax et al., "140 Mb/s Cozxizl Transmission System 8TR609", Philips Telecommunication Review, vol. 37, No. 3, Aug. 1979, pp. 144–160.

Primary Examiner—Stafford D. Schreyer
Attorney, Agent, or Firm—Hill, Van Santen, Steadman & Simpson

[57] ABSTRACT

A method and apparatus for monitoring remotely-fed intermediate regenerative repeaters, in which each intermediate regenerative repeater contains a digital signal regenerative repeater for the digital data signal transmitted and a telemetry signal regenerative repeater for the generation and transmission of a telemetry signal, and in which the telemetry and digital data signals are transmitted over the same transmission line in different frequency bands, provides that the telemetry signal comprises various data blocks. Start and end are characterized by at least one start block and by two end blocks. The result of monitoring is transmitted in an error block. Moreover, a self-check during the transmission of the error block is conducted. The result of the self-check is subsequently transmitted in a test block. Each intermediate regenerative repeater further transmits the received telemetry signal unaltered and following the recognition of the last telemetry signal transmitted by the preceding intermediate regenerative repeater, the regenerative repeater transmits its own locally-generated telemetry signal. At the receiving end, there is an assignment of intermediate regenerative repeaters and telemetry signals so that faulty equipment may be determined by counting of the telemetry signals.

14 Claims, 5 Drawing Figures

TELEMETRY SIGNAL REGENERATIVE REPEATER

METHOD AND APPARATUS FOR MONITORING INTERMEDIATE REGENERATIVE REPEATERS

CROSS REFERENCE TO RELATED APPLICATION

This application is related to an application, Ser. No. 279,458, filed July 1, 1981.

BACKGROUND OF THE INVENTION

1. Field of the Invention

The present invention relates to techniques, both method and apparatus, for monitoring intermediate regenerative repeaters connected between two line terminal devices in a digital transmission system, in which a telemetry signal is transmitted over the same signal path as the digital signal, however, in a different frequency range.

2. Description of the Prior Art

In digital transmission systems it is necessary to employ intermediate regenerative repeaters. In order to locate defective intermediate regenerative repeaters, there are basically two different classes of locating systems. In one class, the communication transmission must be interrupted for the purpose of error location. In this class are all methods having a loop connection in the individual intermediate regenerative repeaters. These methods are very economical and permit an accurate error location. However, this technique can require a longer interruption of operation for errors which occur infrequently or briefly.

In the second class of locating systems, the error location occurs during operation. This has the advantage that no interruption is necessary in order to search for an error and that, in addition, one can recognize a slow impairment of a regenerative repeater at a longer period of time prior to an operational breakdown. These locating systems require a redundant transmission signal which, on the basis of an error-recognizing code, permits a local error evaluation, and a telemetry system for the transmission of the result to an evaluating station. Likewise, naturally, also the complete drop-out of the received digital signal or the failure of the current supply can be transmitted. Although these locating systems have the disadvantage of a higher apparatus expense in the individual intermediate regenerative repeaters, they offer so many advantages in terms of operation, in exchange, that they are increasingly employed, particularly in the case of broadband systems. Such methods are already described in publications.

Therefore, in the journal "Philips Telecommunication Review", Vol. 37, No. 3, August 1979, pp. 144–169, a 140 Mbit/s "coaxial transmission system" is described which is equipped with a monitoring installation. From a main station, the error information of the individual intermediate regenerative repeaters can be polled by way of a keyboard.

In the case of this method, an addressing of the individual intermediate regenerative repeaters is necessary. This requires expensive procedures and leads to unnecessary time delays in the case of error communication. Moreover, different addresses must be set in the case of the intermediate regenerative repeaters.

SUMMARY OF THE INVENTION

It is the object of the present invention to provide a method and an apparatus for monitoring intermediate regenerative repeaters reliably and without addressing, and in which the test results are constantly transmitted to an error-recognition installation.

According to the invention, the above object is achieved in that a separate monitoring is undertaken for each direction of transmission, that a telemetry signal—comprising several data blocks—is transmitted by each intermediate regenerative repeater, beginning with the first, in cyclic succession, that the data blocks are coded with information regarding the state of the received digital signals and the operation of the intermediate regenerative repeater, that the transmission of each following telemetry signal is triggered by the receipt of the telemetry signal of the preceding intermediate regenerative repeater, that the intermediate regenerative repeaters are localized at the receiving side by counting the telemetry signals, and that the different line sections and intermediate regenerative repeaters are monitored through evaluation of the data blocks of the telemetry signals.

The method of the present invention has the advantage that, in the case of a separate monitoring, given an error in one transmission direction, the second transmission path remains fully operative. Periodically, a telemetry signal containing the test results is transmitted by each intermediate regenerative repeater. In the next intermediate regenerative repeater, the received telemetry signals are permitted to pass through and the locally-generated telemetry signal is lined up therewith. The number of lined-up or serially-arranged telemetry signals, therefore, corresponds exactly to the number of intermediate regenerative repeaters. Therefore, a simple evaluation and assignment of telemetry signals and intermediate regenerative repeaters is possible by counting the telemetry signals.

With the method of the present invention it is particularly advantageous that, for the purpose of self-monitoring of the error monitoring installations of the intermediate regenerative repeaters, during the transmission of one or more data blocks of the associated telemetry signal, a control signal is supplied to the error monitoring installations for the purpose of self-monitoring, and that the result is subsequently transmitted in at least a following data block (P, FIG. 2). While the test result is being transmitted, a self-check of the monitoring installation of the intermediate regenerative repeaters is conducted. Following the error signal, the result of the self-test operation is transmitted.

It is likewise advantageous if the telemetry signal comprises at least one start block, one error block for monitoring the path of the intermediate regenerative repeater, a test block for self-monitoring of the intermediate regenerative repeater and its test devices, and at least one end block.

Through the signaling of the beginning and the end of a telemetry signal, it is possible in a simple manner to serially align the telemetry signals of different intermediate regenerative repeaters.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
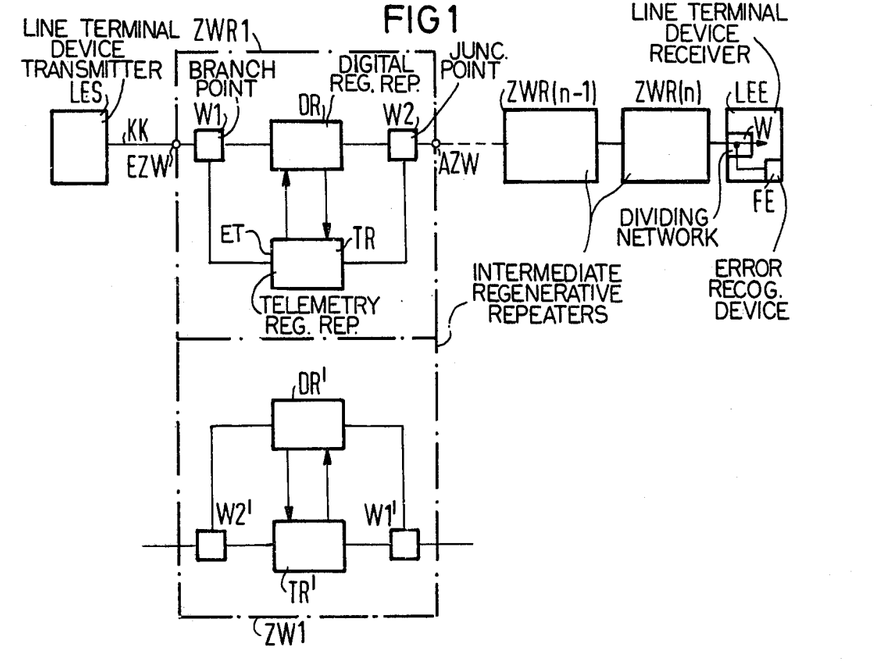
FIG. 1 is a schematic representation of a monitoring system within a digital transmission system.

In FIG. 1, a basic circuit diagram for a digital transmission system is illustrated. Between a first line terminal device transmitter LES and a second line terminal device receiver LEE, depending upon the length and properties of a coaxial cable KK, a plurality of intermediate regenerative repeaters ZWR1 ... ZWR(n−1) and ZWR(n) is located. The output of the transmitter LES of the line terminal device is, for example, connected by way of the coaxial cable KK with the input EZW of a first complete intermediate regenerative repeater ZW1. By way of a first dividing or branching device W1, a digital signal regenerative repeater DR is connected and by way of a second output of the network W1, a telemetry signal regenerative repeater TR is connected by way of an input ET. The network W1 separates the telemetry signal—transmitted in a different frequency band—from the digital data signal. The outputs of both regenerative repeaters are joined together by way of a second network or device W2, herein referred to as a junction point, which is connected to the output AZW of the intermediate regenerative repeater. In the case of some transmission installations, the dividing and junction networks W1, W2 can be replaced by a branch point and a junction point. In the intermediate regenerative repeaters ZW1, this arrangement is present once for each direction of transmission. The modules for the opposite direction are referenced with the same reference characters, however, they are additionally provided with a prime ('). In addition to the complete intermediate regenerative repeater ZW1, only the portions ZWR (n−1) and ZWR (n)—effective in one direction—of the intermediate regenerative repeaters ZW are illustrated in the form of rectangular boxes. The receiver LEE of the second line terminal device again contains the dividing network W and an error recognition device FE.

The telemetry signals are transmitted on the coaxial cable KK in addition to the digital communication signals. In a dividing network at the input of the intermediate regenerative repeater, the telemetry signals are branched off and supplied to a telemetry signal regenerative repeater. The telemetry signal regenerative repeater has the task of regenerating the received telemetry signal, checking the digital signals as well as the digital signal regenerative repeater, and transmitting the test results in the telemetry signal to the evaluating station, which is an error recognition device. If it is a question of a telemetry signal of an intermediate regenerative repeater, then this relates to the telemetry signal generated by its telemetry signal regenerative repeater TR. The digital signal is regenerated, independently of the telemetry signal, in the digital signal regenerative repeater of the intermediate regenerative repeater and is further transmitted. Between the digital signal regenerative repeater and the telemetry signal regenerative repeater connections exist by way of which test results are transmitted. The output signals of both regenerative repeaters, in the case of different frequency bands, are combined by way of a second network W2 or junction point. The voltage supply by way of a remote feed network has not been illustrated.

Figure 2:
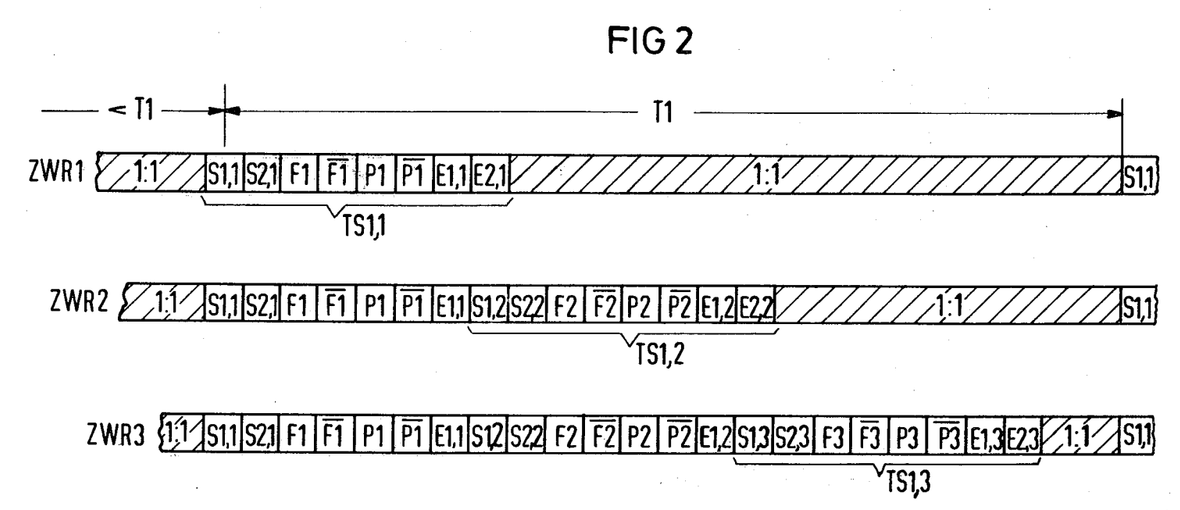
FIg. 2 is a timing diagram illustrating an exemplary embodiment of a telemetry signal corresponding to the present invention.

In FIG. 2, the structure of a telemetry signal TS and the arrangement in series of several telemetry signals is illustrated. The telemetry signal TS comprises, for example, two start blocks S1.1 and S2.1. These are followed by an error block F1 which is transmitted twice, inverted the second time as the error block $\overline{F1}$. The error block F1 contains, for example, the error rate of the transmitted digital data signal. The second error block $\overline{F1}$ is followed by a test block P which is likewise transmitted twice, also inverted the second time as the test block $\overline{P}$. In the test block, the test result of a self-check of the monitoring portion of the intermediate regenerative repeater is transmitted. The test block is followed by two end blocks E1.1 and E2.1.

Figure 3:
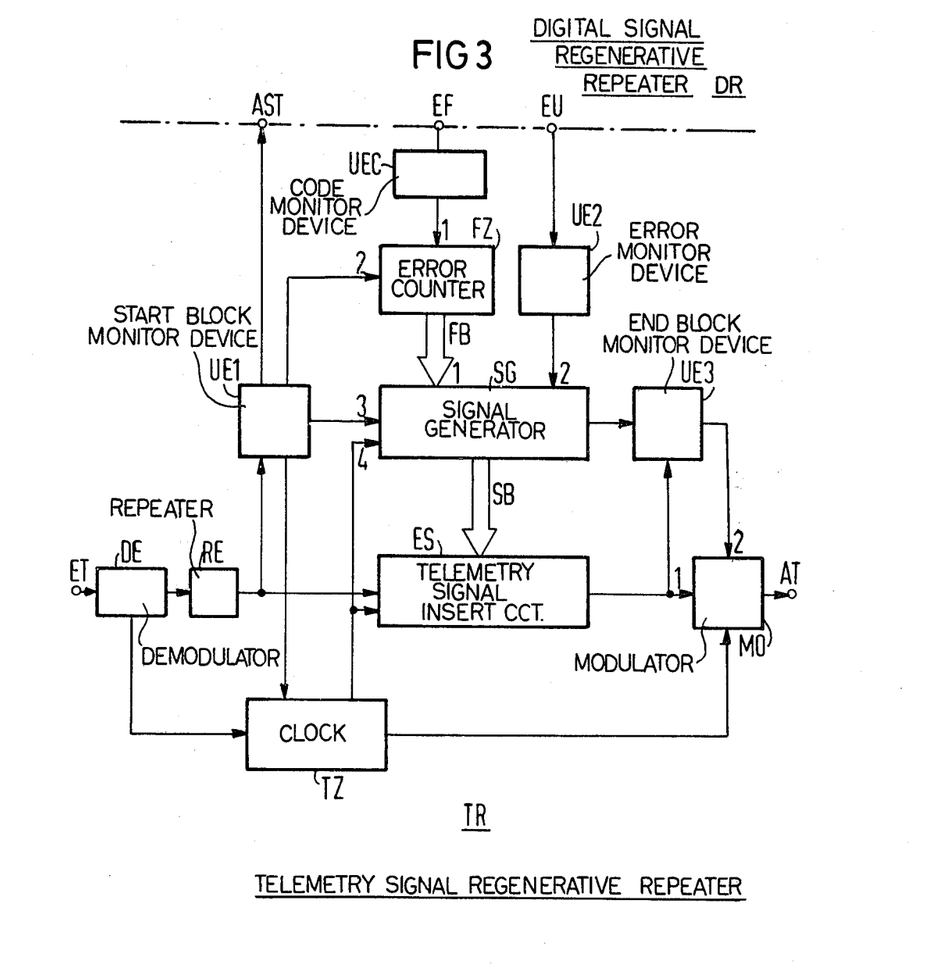
FIG. 3 is a schematic representation of a telemetry signal generator.

The method of the invention will be explained on the basis of FIG. 2. It is assumed here that the current supply of the three-illustrated intermediate regenerative repeaters ZWR1, ZWR2 and ZWR3 is disconnected. After connection, first a permanent combination, instead of the telemetry signal, is delivered by all intermediate regenerative repeaters. After a specified waiting time T2<T1 (where T1 is the cycle time), the first intermediate regenerative repeater begins with the transmission of the first telemetry signal TS1.1. Further reception of a permanent combination or of a telemetry signal during a recovery time T3<T2, the local transmission of telemetry signals is suppressed. Instead, the first telemetry signal of the first intermediate regenerative repeaters ZWR1 is further transmitted by the second intermediate regenerative repeater ZWR2. After receipt of the first end mark E1.1, the second intermediate regenerative repeater ZWR2 begins with the transmission of the start block S1.2 of its first telemetry signal. Since, during the time of transmission of the first start block, a second end block E2.1 is received, also the following blocks of the first telemetry signal TS1.2 of the second intermediate regenerative repeater ZWR2 are transmitted. In the same manner, the third intermediate regenerative repeater ZWR3 allows the first telemetry signals of the first and second intermediate regenerative repeaters ZWR2 to pass through. Only following receipt of a second end signal E2.2 is its first telemetry signal TS1.3 transmitted. If no test signal is transmitted, then, again, advantageously a specific signal, for example a 1:1 exchange is transmitted. During the reception of this continuous signal for a recovery time T3<T2, the intermediate regenerative repeater is prohibited from transmitting a locally-produced telemetry signal; instead, the received signal is further transmitted. An independent transmission of the local telemetry signal, i.e. not generated by the telemetry signal of the preceding intermediate regenerative repeater, occurs only if, for a test time T>T1, no telemetry signal, no permanent or continuous combination or no two successive end blocks are received. FIG. 3 illustrates a basic circuit diagram of a telemetry signal regenerative repeater TR. The telemetry signal is supplied to an input ET. Via a demodulator DE and a regenerative repeater RE, the signal is applied to a telemetry signal insert circuit ES. Connected with the output of the repeater RE, moreover, is a first monitor device UE1 for monitoring start blocks. A first output of the monitoring device UE1 is connected to a connection point AST of the digital signal regenerative repeater DR, while another output is connected to a reset input 2 of an error counter FZ and a third output is connected to an input 3 of a signal generator SG. The error counter FZ is connected by way of a data bus FB to the signal generator SG. The error counter FZ is connected with the output of a code monitor device UEC is connected with the digital signal regenerative repeater DR to monitor the transmitted digital code for errors. By way of an additional input EU an error monitor device UE2 is connected to the digital signal regenerative repeater to monitor its output signal. The output of the error monitor device UE2 is connected to an input 2 of the signal generator SG. The signal generator SG, in turn, is connected by way of a data bus SB with the telemetry signal insert circuit ES. An output of the signal generator SG and the output of the insert circuit ES, moreover, are connected to an end block monitor device UE3, whose output is connected to an input 2 of a modulator MO. The output of the insert circuit ES is also connected to an input 1 of the modulator MO. The output of the modulator is connected to a connection point AT which, in turn, is connected with the second input of the network W2 (FIG. 1) of the intermediate regenerative repeater ZWR. In addition, a central clock TZ is provided which receives a signal from a further output of the demodulator DE. Clock pulse outputs of the central clock TZ are connected to the signal generator SG, to the insert circuit ES and to the modulator MO. In addition, from the start block monitor device UE1, a control line extends to the central clock TZ.

Following the separation of the digital and telemetry signals on the basis of frequency in the network W1, the telemetry signal is supplied by way of the input ET to the demodulator DE. The demodulated signal is rewritten according to amplitude and time in a regenerative repeater RE. The regenerative telemetry signal is then supplied to the start block monitor device for evaluation. Therefore, for example, the start signal is evaluated while a corresponding binary combination is recognized by a gate circuit. If a telemetry signal has been received, then the same is supplied, by way of the insert circuit ES, to the modulator MO and again transmitted unaltered. If, by contrast, the first end block is recognized by the start block monitor device UE1, then a signal is delivered to the signal generator SG which generates a start block and transmits the same to the insert circuit ES. The insert circuit ES contains a parallel/series converter, for example, a shift register. Instead of the second end block of the received telemetry signal, now a start block is transmitted. If the first monitor circuit UE1 recognizes a second end block, then a second start block is transmitted and, subsequently thereto, an error block is transmitted, for example, transmitted twice. Subsequently, two test blocks are transmitted. The information for the error blocks and the test blocks is taken from the error counter and the second monitoring circuit UE2. Whereas the error counter, for example, contains information regarding the transmission error rate, the second monitoring circuit UE2 checks whether the output signal of the digital signal regenerative repeater is error-free. During the transmission of the error blocks, there is delivered, by the first monitoring circuit UE1, at the connection point AST, a signal with which the monitoring installation is tested in the digital signal regenerative repeater. Through this signal, for example, code errors are simulated. These code errors, in turn, as error pulses, reach the error counter FZ, so that a self-diagnosis of the monitoring installations can be conducted. At the end of a locally-generated telemetry signal, two end blocks are transmitted. The third monitoring circuit UE3 checks the number of end blocks output by the insert circuit ES. If a second end block is transmitted by the insert circuit ES, without being generated by the signal generator SG, the same is considered to be a faulty operation of the telemetry signal regenerative repeater. The transmission of such a second, erroneous end block is therefore prevented by the third monitor device UE3. As a consequence, an additional telemetry signal is not joined in series by the following telemetry signal regenerative repeater and the defective telemetry signal regenerative repeater can be recognized.

Figure 4:
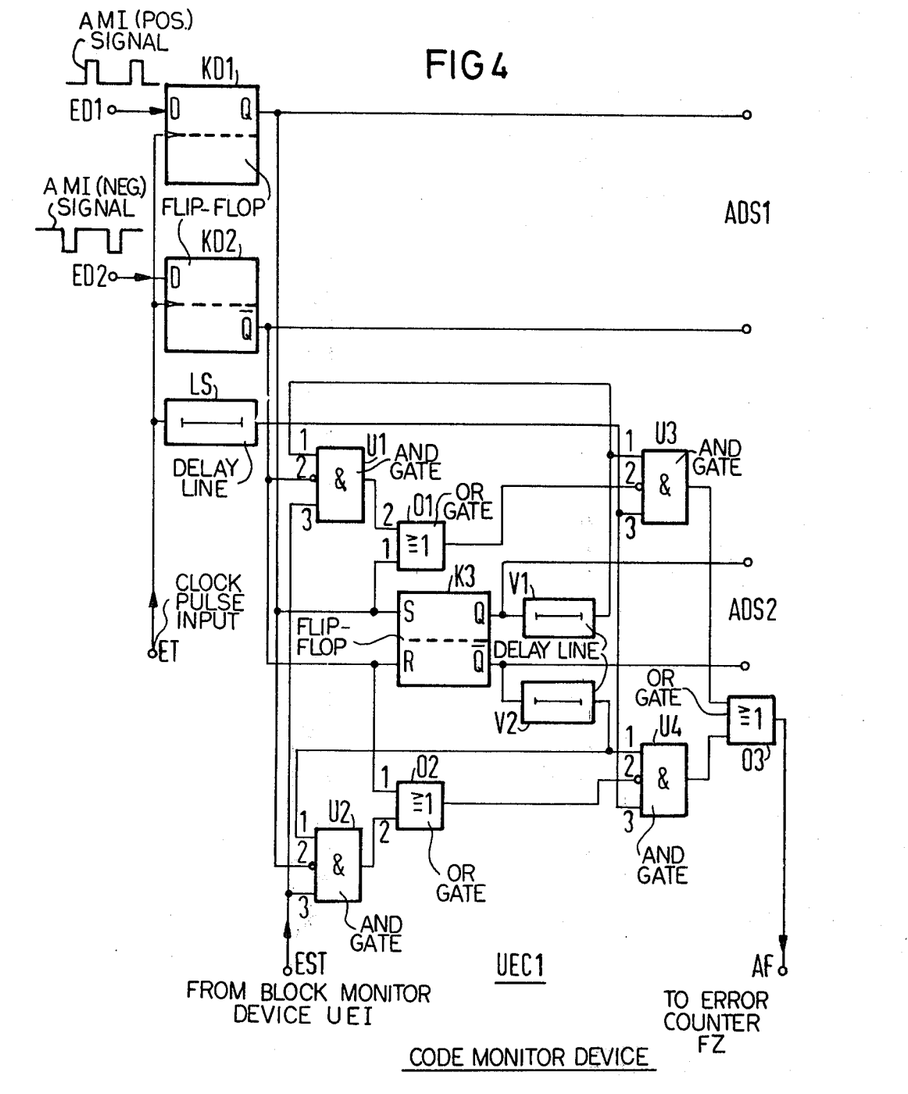
FIg. 4 schematically illustrates a code monitoring circuit for AMI codes.

In FIG. 4, a code monitoring device UEC1 for an AMI (alternate mark inversion) code is illustrated. by way of a first input ED1, the positive pulses of the AMI signal are supplied to the D input of a first D flip-flop KD1. By way of a second input ED2, the negative pulses of the AMI signal are supplied to the D input of a second D flip-flop KD2. The pulses are sampled by a receiving clock pulse at an input ET which is connected to the clock inputs of the flip-flops KD1 and KD2. The Q output of the first D flip-flop KD1 is connected to the set input of a SR (set-reset) flip-flop K3. The $\overline{Q}$ output of the second D flip-flop KD2 is connected with the reset input R of the flip-flop K3. By way of a first delay line V1 (delay time amounting to a bit length) the Q output of the flip-flop K3 is connected to an input 1 of an and gate U3. The $\overline{Q}$ output of the third flip-flop K3 is connected by way of a second delay line with an input 1 of an AND gate U4. As delay lines, also bistable flip-flops, which are activated by the clock pulse ET may be employed. The clock pulse ET is fed by way of a delay line LS to respective inputs 3 of the AND gates U3 and U4. An input 2 of the AND gate U3 is connected to the output of a first OR gate O1, having an input 1 connected to the set input of the flip-flop K3 and an input 2 connected to the output of an AND gate U1. In the same manner, an input 2 of the AND gate U4 is connected to the output of an OR gate O2 which has an input 1 connected to the reset input of the flip-flop K3 and an input 2 connected to the output of an AND gate U2. The outputs of the AND gates U3 and U4 are connected to the inputs of an OR gate O3, whose output is connected to a point AF. At this output, error pulses are delivered and the point AF is connected to the input 1 of the error counter of FIG. 3. The input 1 of the AND gate U1 is connected to the input 1 of the AND gate U3, i.e. fed by the output of the first delay line V1; and the input 2 (an inverting input) of the AND gate U1 is connected to the $\overline{Q}$ output of the second D flip-flop KD2. The input 1 of the AND gate U2 is connected to the input 1 of the AND gate U4, i.e. fed by the delay line V2, and the input 2 (inverting input) of the AND gate U2 is connected to the Q output of the first D flip-flop KD1. The inputs 3 of the AND gates U1 and U2 are connected to a connection point EST which is connected to the connection point AST of the telemetry signal regenerative repeater of FIG. 3. By way of the delay lines V1 and V2, the polarity of the preceding bit is respectively compared with the polarity of the last-sampled bit. If two input pulses of the same polarity have been received, then, by way of the AND gates U3 and U4, an error pulse is delivered. If, by contrast, the prescribed alternation occurs, i.e. a positive pulse is followed by a negative pulse, then no error pulse is emitted. A logic "1" is applied to the control input EST for the purpose of testing. Through the AND gates U1, or U2, respectively, error pulses are caused to be emitted when an additional pulse does not follow a received pulse. An additional circuit variation for checking the error counter in the telemetry signal regenerative repeater would be possible, for example, through the continuous emission of error pulses of the code monitoring circuit. In FIG. 4, the outputs Q of the first D flip-flop KD1 and $\overline{Q}$ of the second D flip-flop KD2 extend to output terminals. These outputs, referenced ADS1, are required for a code-transparent AMI regenerative repeater. In addition, the Q and $\overline{Q}$ outputs of the third flip-flop K3, referenced ADS2, extend to output terminals. These outputs are employed in the case of a non-code-transparent AMI regenerative repeater.

Figure 5:
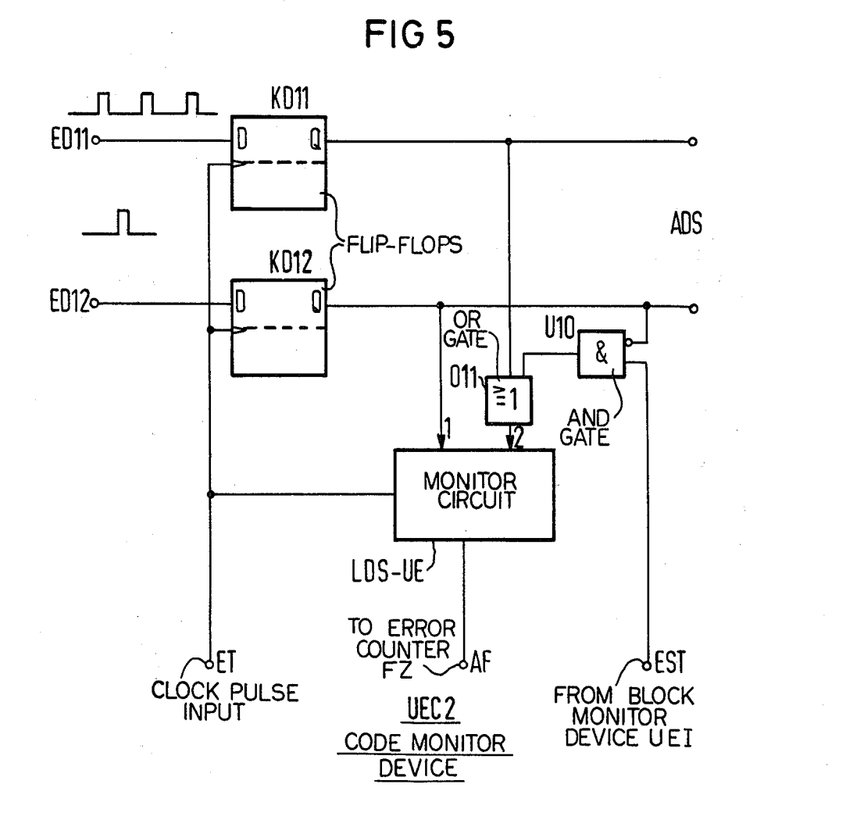
FIG. 5 illustrates a second code monitoring circuit in a regenerative repeater for pBqT codes.

In FIG. 5, a code monitor device UEC2 for pBqT codes is illustrated. By way of a first input ED11, positive pulses are supplied to a first D flip-flop KD11. The negative pulses are inverted, i.e. likewise supplied in the form of positive pulses via a second input ED12, to a second D flip-flop KD12. The Q output of the flip-flop KD12 is connected to an input 1 of a monitoring circuit LDS-UE. The Q output of the flip-flop KD11 is connected, via an OR gate O11, to an input 2 of the monitoring circuit LDS-UE. The clock pulses are applied via an input ET to the clock inputs of the flip-flops KD11 and KD12. The output of an AND gate U10 is connected to the input 2 of the monitor circuit LDS-UE by way of the OR gate O11. The AND gate U10 has an inverting input connected to the Q output of the flip-flop KD12. The other input of the AND gate is connected to a terminal EST which is fed by the start block monitor device UE1 via the connection point AST of FIG. 3. The output of the monitoring circuit LDS-UE is connected to a point AF which, in turn, is connected to the input 1 of the error counter FZ in FIG. 3.

In the case of the pBqT code, specific formation laws are employed in order to maintain a balance of transmitted negative and positive pulses. In the monitoring circuit LDS-UE, this formation law is subsequently completed. If the formation law is not observed, the LDS monitoring circuit LDS-UE emits an error pulse. The LDS monitoring circuit comprises, in the simplest case, a forward-backward counter. If the digital sum does not remain within a specific range, then the LDS monitoring circuit emits a pulse. By way of the control input EST, however, a monitoring signal is supplied to the LDS monitoring circuit. Positive pulses are also simulated to the input 2 of the LDS monitoring circuit when no pulses are received. The monitoring signal is here connected, for example, during the transmission of the error blocks F.

Although I have described my invention by reference to particular illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A method for monitoring a plurality of regenerative repeaters and transmission links connected in series between line terminal devices in a digital transmission system in which a digital data signal and a telemetry signal are transmitted at the same time, in respective frequency bands, in both directions, comprising the steps of:

transmitting a digital data signal and a telemetry signal from the first repeater, which receives no telemetry signal, of the series toward the opposite end of the transmission signal, including generating a telemetry signal to include data blocks of coded information of the error state of the data signal;

at each intermediate regenerative repeater in the series, receiving, in sequence, the digital and telemetry signals transmitted by each preceding intermediate regenerative repeater; regenerating and transmitting the received digital data and telemetry signals in the sequence received, including regenerating separately transmitted telemetry signal and data signals received in both transmission directions;

the regenerating and transmitting including testing the received data signals for errors, generating a respective telemetry signal including error information, and transmitting the newly-generated telemetry signal, in sequence, after transmission of the last-received telemetry signal from the preceding intermediate regenerative repeater; counting the telemetry signals received at a line terminal device at the opposite end of the system; and monitoring the plurality of links and regenerative repeaters by evaluating the data blocks of the telemetry signals.

2. The method of claim 1, further comprising the steps of:

testing error monitoring devices during the transmission of one or more data blocks of the associated telemetry signal; and transmitting the result in at least one subsequent data block of the telemetry signal.

3. The method of claim 1, wherein the step of generating a telemetry signal is further defined as:

generating at least one start block, an error block containing digital signal error information, a test block containing self-diagnostic test information, and an end block.

4. The method of claim 3, and further defined as:

generating two start blocks, two end blocks, and two each of the error and test blocks as redundant information.

5. The method of claim 4, further comprising the steps of:

sensing for the second end block;

in response to receipt of the second end block, overwriting the same with the first start block of the next telemetry signal; and when a second end block is not received, inhibiting transmission of the locally-generated telemetry signal.

6. The method of claim 5, further defined by the step of:

transmitting two end blocks only when the telemetry signal is the locally-generated telemetry signal.

7. The method of claim 1, further comprising the steps of:

at each intermediate regenerative repeater, testing for the presence of the telemetry signal from the preceding regenerative repeater for an interval which is greater than the cycle period T1 required for all of the regenerative repeaters to transmit telemetry signals; and in the absence of the telemetry signal for such interval, transmitting a continuous combination of information signals and inserting therein the locally-generated telemetry signal.

8. The method of claim 7, and further defined as: transmitting digital "1's" as the continuous combination.

9. The method of claim 7, and further defined as: transmitting alternate digital "1's" and "0's" as the continuous combination.

10. The method of claim 1, wherein: the step of inserting the locally-generated telemetry signal is performed, at the earliest, after an interval T2<T1, and preventing the transmission of the locally-generated telemetry signal if the continuous combination of information is received within an interval T3<T2.

11. An intermediate regenerative repeater comprising:
a digital signal regenerative repeater for receiving, regenerating and transmitting coded digital data signals; a telemetry signal regenerative repeater including monitor means connected to said digital regenerative repeater and operable to produce signals representing incoming and outgoing code errors; and
telemetry means connected to said monitoring means and operable in response to the code errors to generate a corresponding telemetry signal and transmit the same with the digital data signals and in a frequency band different from that of the digital data signals.

12. The intermediate regenerative repeater of claim 11, wherein said telemetry means comprises:
an inuput for receiving incoming telemetry signals which include start, error, test and end blocks;
a demodulator connected to said input for demodulating the received telemetry signals;
a telemetry repeater connected to said demodulator for repeating the demodulated telemetry signals;
a block monitor connected to said demodulator for recognizing telemetry blocks;
an error counter connected to said block monitor and to said monitor means for counting errors in the received digital signal;
a signal generator connected to said block monitor and connected to and operable to generate local telemetry blocks indicating the condition of the received data signals; an error monitor connected between said digital signal repeater and said code generator;
a clock-controlled telemetry signal insert circuit connected to receive and temporarily store incoming telemetry signals from said telemetry repeater and connected to said signal generator, said block monitor and said error monitor for receiving and temporarily storing the locally-generated telemetry signal; and
a modulator connected to said telemetry signal insert circuit said block monitor operable to cause a received telemetry signal or a locally-generated telemetry signal to be connected to said modulator depending on the blocks recognized.

13. The intermediate regenerative repeater of claim 11, wherein said monitor means is an AMI code monitor and comprises:
first and second D flip-flops each including a D input for receiving positive AMI pulses and negative AMI pulses, respectively, and a Q output and a $\overline{Q}$ ouput, respectively, and each including a clock input;
first, second and third OR gates each including first and second inputs and an output, said first inputs of said first and second OR gates connected to said Q and $\overline{Q}$ outputs, respectively;
a third, RS, flip-flop including an R input connected to said $\overline{Q}$ output, an S input connected to said Q output, and including its own Q and $\overline{Q}$ outputs;
first and second delay lines connected to respective Q and $\overline{Q}$ outputs of said third flip-flop;
a third delay line connected to receive clock pulses; and first, second, third and fourth AND gates each including a first input, an inverting second input, a third input and an output;
said inverting second inputs of said first and second AND gates connected to said $\overline{Q}$ and Q outputs of said first and second D flip-flops, respectively, and said inverting second inputs of said third and fourth AND gates connected to said outputs of said first and second OR gates;
said outputs of said third and fourth AND gates connected to respective inputs of said third OR gate whose output is connected to said error counter;
said third inputs of said first and second AND gates connected to said block monitor, and said third inputs of said third and fourth AND gates connected to receive clock pulses via said third delay line, said first inputs of said first and third AND gates connected to said first delay line, and said first inputs of said second and fourth AND gates connected to said second delay line.

14. The intermediate regenerative repeater of claim 11, wherein said monitor means comprises a pBqT code monitor which comprises:
first and second D flip-flops each including a clock input for receiving clock pulses, a D input for receiving the same polarity of code pulses and a Q output;
an OR gate including a first input connected to said Q output of said first flip-flop, a second input and an output;
an AND gate including a first input connected to said Q output of said second flip-flop, a second input connected to said block monitor, and an output connected to said second input of said OR gate; and
a monitor circuit including a first input connected to said Q output of said second flip-flop, a second input connected to said output of said OR gate and an output connected to said error counter, and operable to monitor the conditions of said flip-flops and block monitor.

* * * * *